Figure 3:
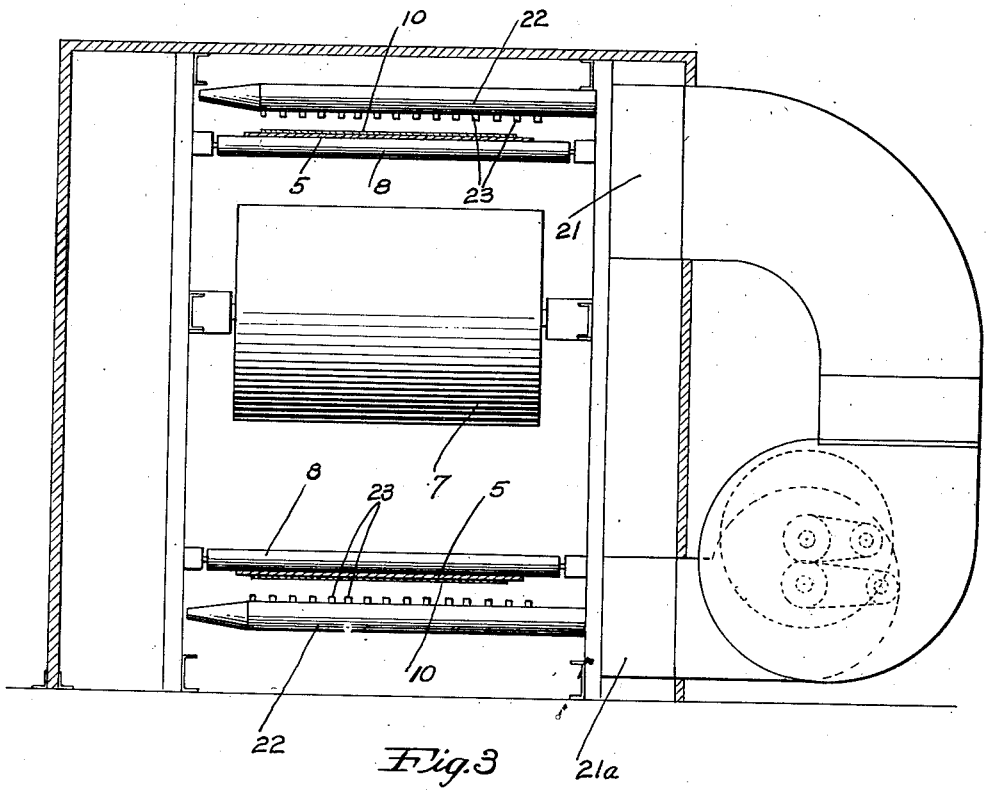

Oct. 14, 1941.   L. B. SEBRELL   2,259,355
PROCESS OF MAKING RUBBER HYDROCHLORIDE FILMS
Filed Dec. 23, 1938   2 Sheets-Sheet 1
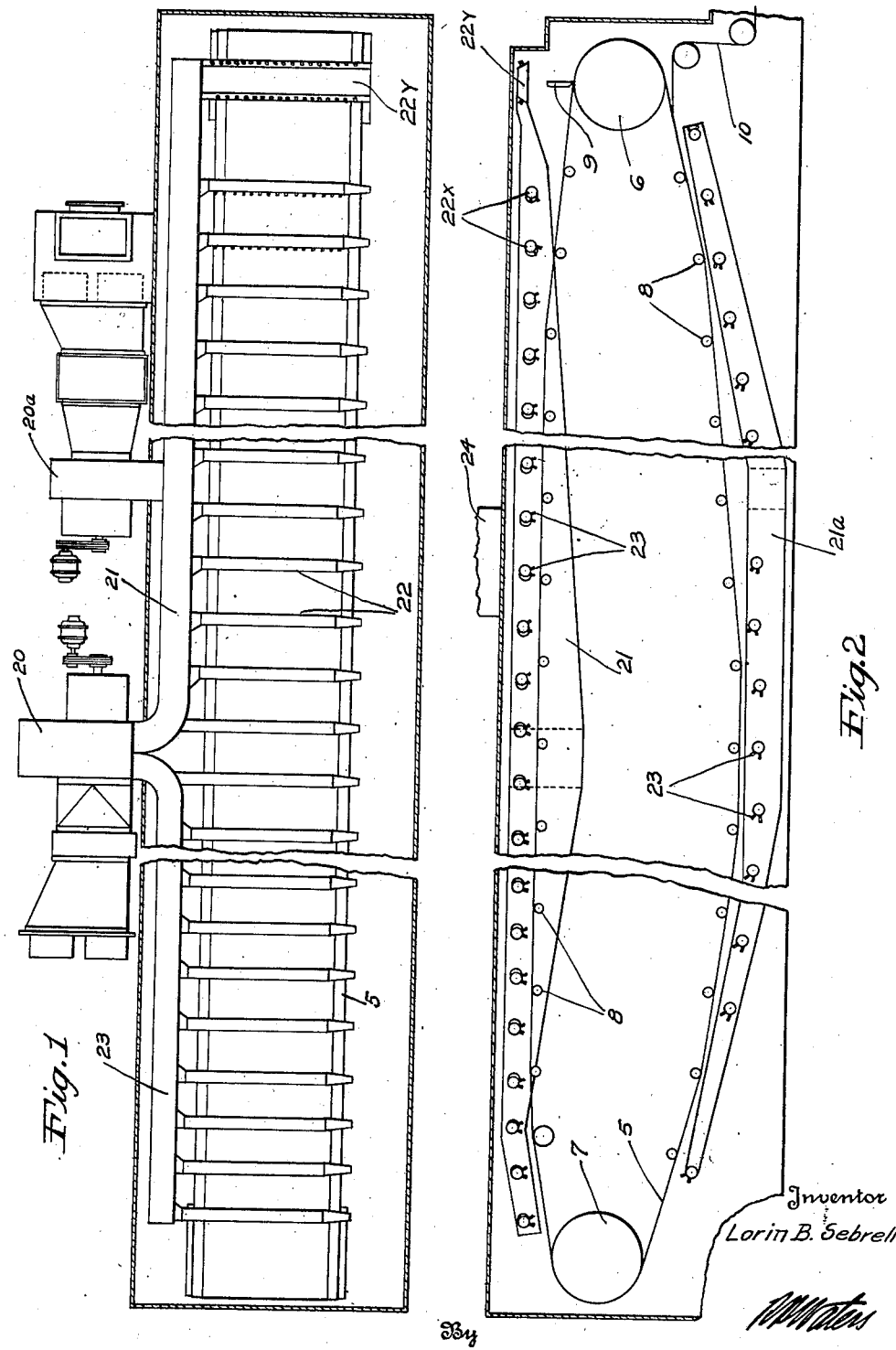

Oct. 14, 1941.  L. B. SEBRELL  2,259,355
PROCESS OF MAKING RUBBER HYDROCHLORIDE FILMS
Filed Dec. 23, 1938  2 Sheets-Sheet 2

Inventor
Lorin B. Sebrell

Attorney

Patented Oct. 14, 1941

2,259,355

UNITED STATES PATENT OFFICE 2,259,355

PROCESS OF MAKING RUBBER HYDROCHLORIDE FILMS

Lorin B. Sebrell, Silver Lake, Ohio, assignor to Wingfoot Corporation, Wilmington, Del., a corporation of Delaware Application December 23, 1938, Serial No. 247,355

3 Claims. (Cl. 18—57)

This invention relates to an improved method of making film from cements of rubber hydrochloride and like film-forming materials, including rubber hydrobromide, etc.

In preparing films of rubber hydrochloride by casting rubber hydrochloride cements and evaporating the solvents it was observed that many of the films obtained were somewhat cloudy or opalescent. This cloudiness or opalescence was found to be due to minute irregularities in the exposed surface of the film, i. e., the surface contiguous to the air space into which the solvent vapors passed on evaporation. Due to these surface irregularities the film lacked the clarity and brilliance desired in a transparent pellicle designed for packaging and the manufacture of rain-coats, etc. These surface irregularities were found in film cast from different solvents, viz. films cast from chloroform cements of rubber hydrochloride and films cast from benzene cements of rubber hydrochloride. These two solvents are typical of solvents which have a different action on rubber hydrochloride. Chloroform cements do not gel on cooling. Other solvents which like chloroform produce cements which do not gel include methylene dichloride, dichlor ethylene, tri chlor ethane, tetrachlorethane, etc. Benzene cements gel on cooling. So do cements made with toluene, xylene, trichlor ethylene, ethylene dichloride, i. e., 1,2-dichlorethane, propylene dichloride, chlorobenzene, etc.

No difficulty was experienced in producing clear films from non-gelling cements containing higher boiling solvents, such as tetrachlorethane, etc. Although such films are clear, the heat and time required for the evaporation of such higher boiling solvents makes their use undesirable for commercial film production. The low boiling solvents, i. e. solvents boiling under about 115° C. all gave cloudy films regardless of whether gelling or non-gelling cements were employed. The difference in the clarity of films produced from non-gelling cements containing higher boiling solvents, as compared with those produced from either non-gelling or gelling cements containing the lower boiling solvents, has been found to be due to the fact that the low boiling solvents evaporates so rapidly that under the usual operating conditions their surface becomes so cool because of the heat absorbed on evaporation of the solvent that it solidifies prematurely due either to gelation or skinning, i. e. before sufficient solvent has evaporated from the body of the film under the surface to give ultimately uniform solidification of the entire film mass, without contraction or other distortion of the surface.

According to this invention rubber hydrochloride cement is cast on a film-forming surface and the solvent is evaporated by the circulation of heated air over the exposed surface of the cement and premature solidification of the rubber hydrochloride at the surface of the film, whether it be due to the gelling of cements such as benzene cements, or the skinning over of other cements such as chloroform cements, is prevented by maintaining the exposed surface of the film during the initial stage of the evaporation of solvent above the temperature at which such gelling or skinning over or other solidification takes place. All the heat required for the evaporation of solvent is supplied by the heated air.

The invention will be described in connection with the accompanying drawings which illustrate the first of two drying chambers in which the film is supported by a belt until sufficient solvent has been evaporated to produce a self-sustaining film. From this first drying chamber the film passes into a second drying chamber in which it is festooned so that the balance of the solvent may be evaporated from both surfaces of the film simultaneously. The use of two such chambers for the production of rubber hydrochloride film is disclosed in Calvert U. S. Patent 2,078,526.

Fig. 1 shows a sectional plan view of the first drying chamber. Fig. 2 is a sectional elevation and Fig. 3 is a sectional end view.

The drying chamber illustrated is equipped with a belt 150 feet long. The speed of the belt is varied depending upon the thickness of the film produced, for example in the production of rubber hydrochloride film .001″ thick the belt is operated at 65–70 feet per minute and for the production of film .002″ thick the belt is operated at about 25 feet per minute. The belt 5 passes over the pulleys 6 and 7 and is supported by the rollers 8. One or both of the pulleys is driven at the desired speed. The distance of the bottom and of the top of the chamber from the belt surface is about 1 foot. The rubber hydrochloride cement is supplied to the belt under the knife 9 by any suitable supplying means which may be a well or other device known in the art. As the film passes through the chamber supported by the belt the solvent is evaporated and the film 10 on leaving the chamber contains a small percentage of solvent.

The invention will be described more particularly as applied to the production of film from a benzene cement of rubber hydrochloride of 7.5% concentration. The solvent content of the film 10 as it leaves the first chamber is about 2 to 6% of benzene depending upon the thickness of the film produced. For films about .002" thick it may be 5 or 6% whereas for films .001" thick it should be 2%.

Heat for the evaporation of the solvent is supplied solely from the heated air which is introduced into the chamber at such a temperature and such a rate, approximately 15,000 cubic feet per minute, as to prevent premature solidification of rubber hydrochloride at the surface of the cement. The heated air is supplied by the blowers 20 and 20a. These are connected with the headers 21 and 21a respectively. From the headers the heated air passes into the pipes 22 and out through the openings 23. The air is heated before it enters the blowers. That passing through the blower 20 is at a temperature of about 200 to 220° F. and that passing through the blower 20a is heated to about 170 to 190° F. The air and gases leave the chamber through the exit 24 at a temperature of about 145° to 165° F. and are passed through solvent recovery equipment (not shown).

The air although directed toward the film must not meet it with sufficient force to agitate the surface of the cement. The drawings show that the openings in the first two pipes 22X, which are directly above the freshly cast film, are not perpendicular to the film, but the air from the pipes meets this fresh film at an angle so as not to disturb the surface of the cement. The openings in the flattened pipe, 22Y, which is above the knife 9 are directed away from the film. This pipe 22Y has a larger cross-section than the other pipes and carries a larger amount of air than the other pipes so as to insure adequate circulation of air above the freshly cast film, and adjacent to it. The vapors of solvent escape more rapidly from the freshly cast film than film from which considerable solvent has already been removed. This tends to cause greater cooling of the surface of the freshly cast film and consequently a larger supply of heated air must be furnished to prevent premature solidification at the surface.

Temperature readings indicate that in traveling the first thirty inches from the knife 9 the temperature of the body of the cement film under the surface is advantageously kept at about 120 to 130° F. Ten feet from the knife the temperature of the film under the surface may be 116° F. and solidification may begin at about this point without producing any appreciable cloudiness in the final film product. The above figures were taken from a run using a 7.5% solution in benzene of rubber hydrochloride of about 30% chlorine content prepared according to Calvert 1,989,632. It was found impossible to measure accurately the temperature of the exact surface of the film.

From the first drying chamber the film is passed to a second drying chamber where the temperature is maintained at 150–160° F.

Although the invention has been described more particularly as applied to the production of rubber hydrochloride film from benzene cements it is not limited thereto but applies to the evaporation of solvent from other rubber hydrochloride cements in which a low boiling, fast vaporizing solvent is employed. It includes the use of both non-gelling and gelling solvents with boiling points not appreciably above 115° C. Using cements made from solvents of high boiling point no great difficulty is experienced in the production of clear films although there is no close control of the temperature employed. This is due to the fact that in order to rapidly evaporate solvent from such cements higher temperatures are required and there is in general no tendency to gel or skin over when such higher temperatures are used.

I claim:

1. The method of forming clear rubber hydrochloride film which comprises casting a cement of a rubber hydrochloride in a low-boiling solvent on a surface, blowing heated air against the exposed surface of the film immediately after the film is cast, at such a rate and at such a temperature as to effect evaporation of solvent and maintain the surface of the film of the rubber hydrochloride cement at such an elevated temperature as to prevent premature solidification of rubber hydrochloride at the exposed surface of the film which premature solidification would produce irregularities in the surface of the film on completing the evaporation of solvent therefrom.

2. The method of forming clear rubber hydrochloride film which comprises casting a benzene cement of a rubber hydrochloride on a surface, blowing heated air against the exposed surface of the film of rubber hydrochloride, immediately after it is cast, at such a rate and at such a temperature as to transfer sufficient heat from the air to the film to effect evaporation of solvent and maintain the exposed surface of the cement film above the temperature at which gelation occurs.

3. The method of forming clear rubber hydrochloride film which comprises casting a film of a rubber hydrochloride cement in a low boiling solvent on a film-forming surface, evaporating solvent from the cement and during the initial stage of such evaporation blowing heated air against the exposed surface of the film of cement at such a rate and at such a temperature as to effect the evaporation of solvent and maintain the surface of the film at a sufficiently high temperature to keep the rubber hydrochloride dissolved therein and prevent premature solidification of the rubber hydrochloride at the exposed surface of the film.

LORIN B. SEBRELL.